US011985485B2

(12) United States Patent
Catic et al.

(10) Patent No.: US 11,985,485 B2
(45) Date of Patent: May 14, 2024

(54) METHOD OF FITTING A HEARING AID GAIN AND A HEARING AID FITTING SYSTEM

(71) Applicant: Widex A/S, Lynge (DK)

(72) Inventors: Jasmina Catic, Gentofte (DK); Anne Vikaer Damsgaard, Ganloese (DK); Sueli Aparecida Caporali, Frederikssund (DK); Jens Cubick, Copenhagen (DK)

(73) Assignee: Widex A/S, Lynge (DK)

( * ) Notice: Subject to any disclaimer, the term of this patent is extended or adjusted under 35 U.S.C. 154(b) by 82 days.

(21) Appl. No.: 17/802,687

(22) PCT Filed: Mar. 1, 2021

(86) PCT No.: PCT/EP2021/055023
§ 371 (c)(1),
(2) Date: Aug. 26, 2022

(87) PCT Pub. No.: WO2021/175772
PCT Pub. Date: Sep. 10, 2021

(65) Prior Publication Data

US 2023/0144386 A1 May 11, 2023

(30) Foreign Application Priority Data

Mar. 2, 2020 (DK) ............................. PA202000268

(51) Int. Cl.
*H04R 25/00* (2006.01)

(52) U.S. Cl.
CPC ............. *H04R 25/70* (2013.01); *H04R 25/30* (2013.01); *H04R 25/507* (2013.01); *H04R 2460/11* (2013.01)

(58) Field of Classification Search
CPC ...... H04R 25/70; H04R 25/30; H04R 25/507; H04R 2460/11; H04R 25/305
USPC ................. 381/318, 312, 60, 23.1, 58, 71.11
See application file for complete search history.

(56) References Cited

U.S. PATENT DOCUMENTS

| | | | | |
|---|---|---|---|---|
| 2008/0260171 | A1* | 10/2008 | Nordahn ................ | H04R 25/70 381/60 |
| 2009/0052705 | A1 | 2/2009 | Binder et al. | |
| 2018/0295455 | A1 | 10/2018 | Eichfeld et al. | |

FOREIGN PATENT DOCUMENTS

| | | | |
|---|---|---|---|
| EP | 1 973 381 | A2 | 9/2008 |
| EP | 1 992 196 | | 11/2008 |
| EP | 2 640 095 | A1 | 9/2013 |
| WO | 03/034784 | A1 | 4/2003 |
| WO | 2007/045271 | A1 | 4/2007 |
| WO | 2007/099116 | A3 | 9/2007 |
| WO | 2018/141557 | A1 | 8/2018 |

OTHER PUBLICATIONS

Johan Hellgren et al., "System identification of feedback in hearing aids", J. Acoust. Soc. Am. Jun. 1999, pp. 3481-3496, vol. 105, No. 6.

(Continued)

*Primary Examiner* — Norman Yu
(74) *Attorney, Agent, or Firm* — Sughrue Mion, PLLC

(57) ABSTRACT

A method of fitting a hearing aid gain (100) adapted to take the vent effect into account. The invention is also directed at a hearing aid fitting system adapted to carry out said method.

10 Claims, 2 Drawing Sheets

(56) References Cited

OTHER PUBLICATIONS

International Search Report for PCT/EP2021/055023 dated, May 28, 2021 (PCT/ISA/210).
Written Opinion for the International Searching Authority for PCT/EP2021/055023 dated, May 28, 2021 (PCT/ISA/237).
Danish Search Report for PA 2020 00268 dated Aug. 25, 2020.

* cited by examiner

METHOD OF FITTING A HEARING AID GAIN AND A HEARING AID FITTING SYSTEM

CROSS REFERENCE TO RELATED APPLICATIONS

This application is a National Stage of International Application No. PCT/EP2021/055023 filed Mar. 1, 2021, claiming priority based on Danish Patent Application No. 202000268 file Mar. 2, 2020.

FIELD OF THE INVENTION

The present invention relates to a method of fitting a hearing aid system and a hearing aid fitting system adapted to carry out said method. More specifically the present invention is directed at prescribing a hearing aid system gain by estimating a vent effect.

BACKGROUND OF THE INVENTION

Within the context of the present disclosure a hearing aid can be understood as a small, battery-powered, microelectronic device designed to be worn behind or in the human ear by a hearing-impaired user. Prior to use, the hearing aid is adjusted by a hearing aid fitter according to a prescription. The prescription is based on a hearing test, resulting in a so-called audiogram, of the performance of the hearing-impaired user's unaided hearing. The prescription is developed to reach a setting where the hearing aid will alleviate a hearing loss by amplifying sound at frequencies in those parts of the audible frequency range where the user suffers a hearing deficit. A hearing aid comprises one or more microphones, a battery, a microelectronic circuit comprising a signal processor adapted to provide amplification in those parts of the audible frequency range where the user suffers a hearing deficit, and an acoustic output transducer. The signal processor is preferably a digital signal processor. The hearing aid is enclosed in a casing suitable for fitting behind or in a human ear.

Within the present context a hearing aid system may comprise a single hearing aid (a so-called monaural hearing aid system) or comprise two hearing aids, one for each ear of the hearing aid user (a so called binaural hearing aid system). Furthermore, the hearing aid system may comprise an external device, such as a smart phone having software applications adapted to interact with other devices of the hearing aid system. Thus, within the present context the term "hearing aid system device" may denote a hearing aid or an external device.

Generally a hearing aid system according to the invention is understood as meaning any system which provides an output signal that can be perceived as an acoustic signal by a user or contributes to providing such an output signal and which has means which are used to compensate for an individual hearing loss of the user or contribute to compensating for the hearing loss of the user. These systems may comprise hearing aids which can be worn on the body or on the head, in particular on or in the ear, and can be fully or partially implanted. However, some devices whose main aim is not to compensate for a hearing loss may nevertheless be considered a hearing aid system, for example consumer electronic devices (televisions, hi-fi systems, mobile phones, MP3 players etc.) provided they have measures for compensating for an individual hearing loss.

In WO 03/034784 A1 a digital hearing aid system is described where a part of the system is intended for delivering sound into an ear canal of a hearing aid user and this part provides the ear canal with a vent or ventilation canal in order to reduce the occurrence of the known occlusion effect which is often experienced uncomfortable by the hearing aid user.

The geometry of individual ear canals of a hearing aid user interacts with the dimensions of the ventilation canal and the other mechanical properties of the ear canal part of the hearing aid in determining the acoustic properties and hence the actual gain of the hearing aid.

Even if a hearing aid has a sealed ear canal part (which in the following may also be denoted an earpiece) a leakage between the ear canal walls and the ear canal part of the hearing aid may occur that influences the acoustic properties of the hearing aid. Such a leakage may even occur by using custom-made earpieces or a hearing aid with a flexible earpiece, for example one made by silicone, which normally adapts to the individual ear canal geometry of the user.

The fitting of a hearing aid is normally done by an audiologist in a fitting session in which the hearing threshold levels in certain frequency bands of the future hearing aid user is measured to determine the appropriate hearing aid gain over a frequency range. The frequency dependent measurement of the hearing loss or the so-called hearing threshold level (HTL) may be done by recording an audiogram. An audiogram is the graphical representation of a hearing test. It shows for each ear the minimum sound level required for the future hearing aid user to be able to hear sound per different frequency. The provided sound in the test may be produced by loudspeakers or a hearing aid like device which then also measures the sound pressure at the eardrum at the hearing threshold.

The necessary gain to be provided by the hearing aid is then calculated based on the audiogram and further fitting rules. However, in case a leakage or a ventilation canal (vent) is present when using the actual hearing aid then this (which in the following may be denoted the vent effect) need to be taken into account when determining the final hearing aid gain.

WO-A1-2007045271 discloses a method and system for fitting a hearing aid using an estimated vent parameter and more particularly to a method and system for fitting a hearing aid gain by estimating the best fit acoustic model of the hearing aid by modelling a performed measurement with transmission line theory.

However, it is no straightforward task to determine the vent effect, especially for so called instant-fit earpieces (i.e. flexible earpieces that are not individualized for a specific user) that may be difficult to model.

Consequently, there is a need for improved techniques for fitting a hearing aid gain taking the acoustic properties of the hearing aid in the individual ear canal of the hearing impaired person into account.

SUMMARY OF THE INVENTION

It is therefore an object of the present invention to provide an improved method of fitting a gain for a hearing aid of a given type.

The invention, in a first aspect, therefore provides a method of fitting a hearing aid gain according to claim 1.

This provides a method of fitting a hearing aid gain that is advantageous with respect to at least perceived sound quality and speech intelligibility.

The invention, in a second aspect, provides a hearing aid fitting system according to claim 9.

This provides a hearing aid fitting system gain that is advantageous with respect to providing a hearing aid fitting with at least improved perceived sound quality and speech intelligibility.

Further advantageous features appear from the dependent claims.

Still other objects of the present invention will become apparent to those skilled in the art from the following description wherein the invention will be explained in greater detail.

BRIEF DESCRIPTION OF THE DRAWINGS

The invention will be readily understood from the following detailed description in conjunction with the accompanying drawings. As will be realized, the invention is capable of other different embodiments, and its several details are capable of modification in various, obvious aspects all without departing from the invention. Accordingly, the drawings and descriptions will be regarded as illustrative in nature and not as restrictive. In the drawings.

DETAILED DESCRIPTION

In the present context the impact, from a leakage or a ventilation canal in a hearing aid earpiece, on the gain to be applied by the hearing aid may in the following be denoted the vent effect.

The vent effect is defined as the sound pressure level at the ear drum as provided by a hearing aid in a sealed ear canal (i.e. an ear canal without intentional or unintentional acoustical leakage) relative to the sound pressure level provided by a hearing aid with an earpiece that does not provide a sealed ear canal. The vent effect may be expressed as a gain value for any number of frequency bands for use in the hearing aid.

Figure 1:
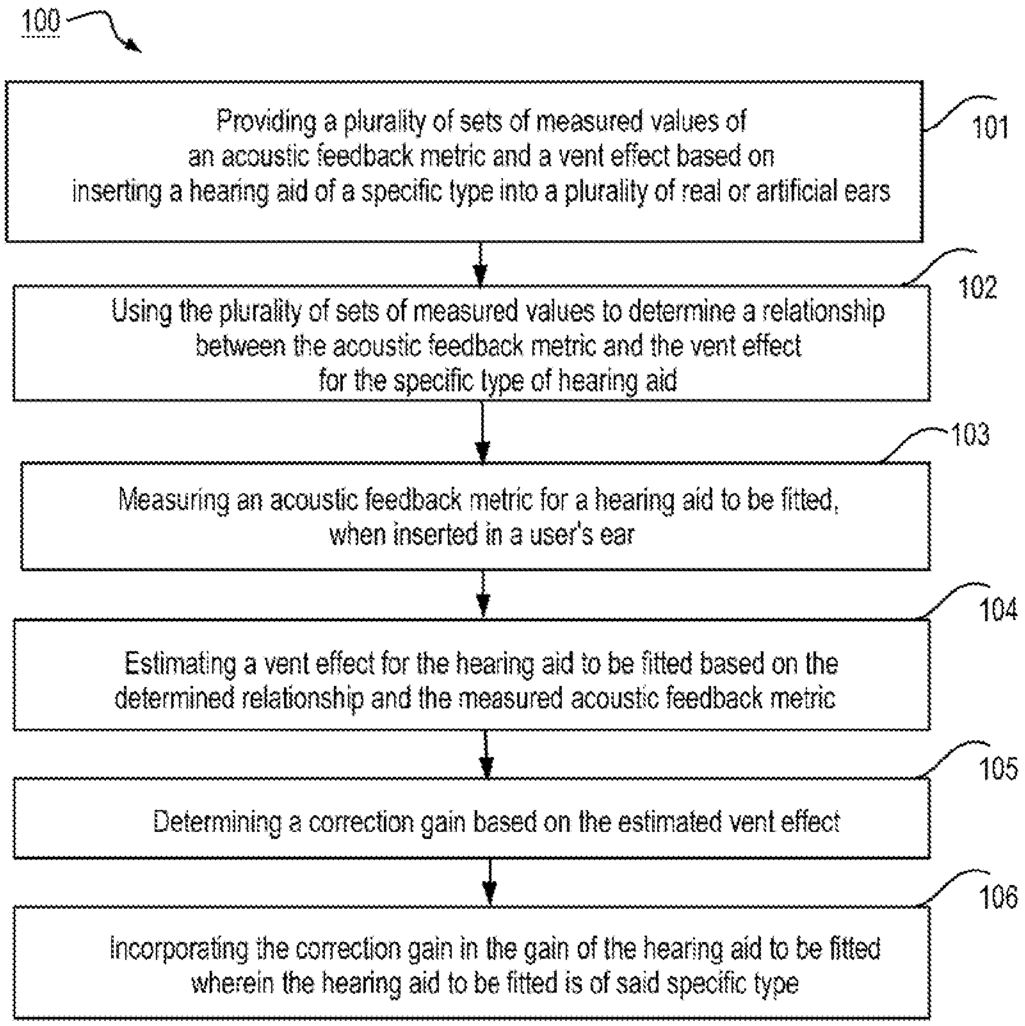
FIG. 1 illustrates highly schematically a method of fitting a hearing aid gain according to an embodiment of the invention.

Reference is now made to FIG. 1, which illustrates highly schematically a method 100 of fitting a gain of a hearing aid according to a first embodiment of the invention.

In a first method step 101, a plurality of sets of measured values of an acoustic feedback metric and a vent effect based on inserting a hearing aid of a specific type into a plurality of real or artificial ears is provided.

According to an embodiment, the vent effect for a hearing aid of a given type is measured by first inserting the hearing aid in a real ear or in an artificial ear and measuring the sound pressure level at the ear drum. In the case of a real ear the sound pressure level is typically measured using a thin probe that is adapted to only have an insignificant impact on the measured vent effect. In the case of an artificial ear the probe may be built into the artificial ear drum. Secondly the real or artificial ear is acoustically sealed using e.g. some kind of ear impression material, such as addition cure silicone, and the resulting sound pressure level is measured. Finally, the vent effect for the given hearing aid type is determined as the difference between the two measured sound pressure levels.

According to an embodiment, the acoustic feedback metric is the loop gain. In the present context the loop gain represents an in-situ measurement of sound transmitted through an acoustic system comprising the leakage path. The loop gain may be measured by a so-called feedback test, which is normally performed during the fitting routine in order to estimate the maximum hearing aid gain. According to an embodiment the method according to the present invention will therefore advantageously not require any additional measurements to be carried out during the hearing aid fitting.

According to an embodiment the specific type of hearing aid is defined by the shape and material of the hearing aid earpiece.

According to a more specific embodiment the shape of the earpiece of said specific type of hearing aid is selected from a group of shapes comprising single dome shaped, double dome shaped, tulip dome shaped, hollow ball shaped and hollow bulb shaped, wherein the latter two are further described in the patent application WO-A1-2018/228988. Using a more generic term this type of earpieces may also be denoted instant fit earpieces, which emphasizes the fact that these types of earpieces are not individualized to a specific user.

In a second method step 102, the plurality of sets of measured values are used to determine a relationship between the acoustic feedback metric and the vent effect for said specific type of hearing aid.

Figure 2:
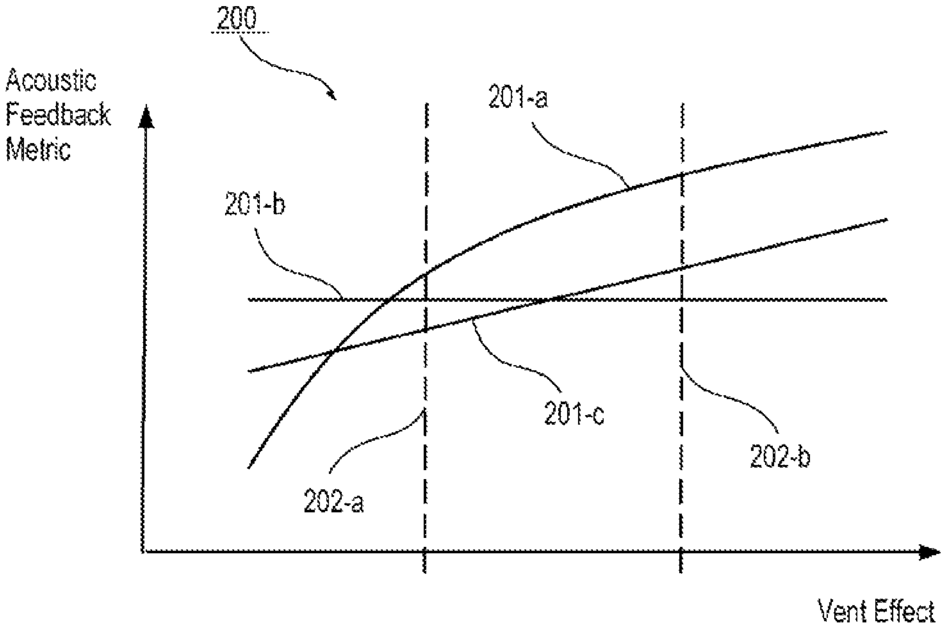
FIG. 2 illustrates highly schematically a relationship between an acoustic feedback metric and a vent effect according to an embodiment of the invention.

In order to explain how this relationship can be determined reference is now given to FIG. 2 that illustrates highly schematically a part of the relationship in the form of a set of curves 200 in a coordinate system with the measured frequency dependent acoustic feedback metric along the ordinate and the measured frequency dependent vent effect along the abscissa.

The curves 201-*a*, 201-*b* and 201-*c* each illustrates a function with a predefined shape adapted to obtain a linear or non-linear model of the relationship between the measured data points (not shown in FIG. 2 for reasons of clarity) for the acoustic feedback metric and the corresponding vent effect at a specific frequency or in a specific frequency band. The functions with predefined shape are able to capture specific relationships between the acoustic feedback metric and the vent effect at a specific frequency. According to more specific embodiments the predefined functions may be selected from a group of predefined functions comprising linear functions with or without curvature and asymptotic exponentials. The inventors have found that the predefined shape of the available functions together with a controlled number of parameters is preferred in order to avoid overfitting to trends in the measured data point that are not relevant for determining the desired properties of the specific hearing aid type.

According to preferred embodiments the data points are measured at frequency bands that correspond to frequency bands of the hearing aids or measured at center frequencies of corresponding hearing aid frequency bands.

Thus, according to the present embodiment, a set of predefined functions is then evaluated, for each specific frequency or frequency band, in order to determine the best function to model the measured data. This is done by assessment of standard error and normality of residuals, as these measures are appropriate for both linear and nonlinear functions, such that a direct comparison can be made of both prediction preciseness and how well each function captures the underlying acoustic feedback metric and vent effect relationship from the noisy measured data.

Having determined the best functions to model the measured data, i.e. the highly schematical curves 201-*a*, 201-*b* and 201-*c* in FIG. 2, then, each of the straight lines 202-*a* and 202-*b* can, according to an embodiment, be used to find for the specific frequencies associated with the curves 201-*a*, 201-*b* and 201-*c* corresponding values of the acoustic feedback metric and the vent effect.

Figure 3:
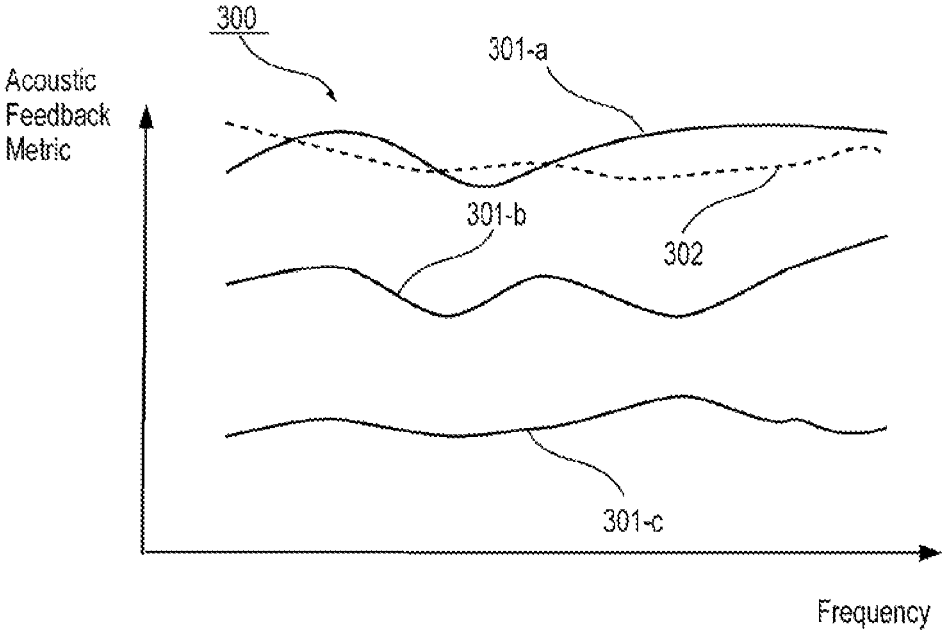
FIG. 3 illustrates highly schematically another relationship between an acoustic feedback metric and a vent effect according to an embodiment of the invention.

Reference is now given to FIG. 3, which illustrates highly schematically how the determined best functions (represented by the curves 201-*a*, 201-*b* and 201-*c* in FIG. 2) may be combined across frequency to form curves 301-*a*, 301-*b* and 301-*c*, each representing the acoustic feedback metric as a function of frequency for a specific value of the vent effect.

In a third method step 103, an acoustic feedback metric for said specific hearing aid, to be fitted, is measured (when inserted in a user's ear) as a function of frequency. Referring again to FIG. 2, the dash dotted curve 302 represent these measured data.

In a fourth method step 104, a vent effect for the specific hearing aid, to be fitted, is estimated based on the determined relationship between the acoustic feedback metric and the vent effect and the measured acoustic feedback metric for the specific hearing aid type to be fitted.

The estimation of the vent effect is carried out using a method selected from a group comprising: least square methods (such as least mean square), estimation least absolute residuals and one-step sine estimator. It is noted that by using these methods to find the best possible fit between the measured acoustic feedback metric, for the specific hearing aid type to be fitted, and one of the acoustic feedback metrics representing a specific value of the vent effect, then it is ensured that even if the measured acoustic feedback metric is inaccurate at some frequencies, a reasonable estimate of the vent effect can still be found as long as a significant number of utilized frequencies or frequency bands contain accurate measurements.

According to a more specific embodiment a plurality of rank correlation coefficients between measured acoustic feedback metrics and measured vent effects for each of said plurality of specific frequencies or frequency bands and based on the plurality of sets of measured values is determined. Hereby the importance of the considered frequencies relative to each other can be determined based on the determined rank correlation coefficients and consequently determining appropriate weights before calculating the errors of one of the various least square methods, such as e.g. the LMS error.

According to an even more specific embodiment Spearmans rank coefficient is used to determine the weights for each discrete frequency or frequency band by using the plurality of sets of measured values to find a plurality of measured vent effects at 350 Hz and a corresponding plurality of measured acoustic feedback metric values at the considered frequency. It is noted, as already explained above, that the plurality of sets of measured values reflect the plurality of different real and/or artificial ears that have been used to obtain the measured values.

In a fifth method step 105, a correction gain is determined based on the estimated vent effect. According to one specific embodiment this may be done by adding gain in order to compensate for the low frequency sound pressure level loss due to the vent effect.

According to another embodiment the correction gain is adapted to reduce or eliminate the gain in the low frequency in order to avoid compromising the sound quality as a result of interference (the so called comb filter effect) between the directly transmitted sound and the sound processed by the hearing aid.

In a sixth and final step 106, the correction gain is incorporated in the gain of the hearing aid to be fitted, wherein the hearing aid to be fitted is of said specific type.

According to an alternative embodiment the step of using the first plurality of sets of measured values to derive a relationship between the acoustic feedback equivalent and the vent effect comprises the step of training a neural network to determine the vent effect based on a measured frequency dependent acoustic feedback metric.

According to yet another embodiment of the present invention a hearing aid fitting system adapted to carry out the various method embodiments presented above is disclosed.

According to a more specific embodiment the hearing aid fitting system comprises a display device adapted to display a plurality of hearing aid fitting procedure screens that again are adapted to initially prompt a hearing aid fitter to select a specific hearing aid earpiece; and secondly adapted to provide a correction gain to be incorporated in the final hearing aid gain in order to compensate the vent effect.

According to an even more specific embodiment the hearing aid fitting system is only adapted to use the various methods of the present invention when an instant fit earpiece is selected.

According to an additional embodiment a hearing aid system capable of carrying out a feedback test and hereby providing a measurement of an acoustic feedback metric according to the invention, may be configured to provide an adaptive correction gain in order to compensate the sound loss due to the vent effect. This is especially advantageous because the position and shape of the hearing aid earpiece in the ear (and hereby the vent effect) may change during the day e.g. due to the user re-inserting the earpiece in the ear, which especially for instant fit earpieces may be done several times during the day.

According to a more specific embodiment the hearing aid system is operationally connected with a server that is configured to receive a measured acoustic feedback metric for a specific hearing aid type and in response hereto return a new correction gain. According to a still more specific embodiment the server is additionally configured to use the received measured acoustic feedback metrics for various forms of data analysis in order to e.g. investigate the reproducibility of the positioning of a given type of earpiece for a given user or to investigate whether a given type of earpiece appears to be degrading over time. According to an even more specific embodiment a measurement of an acoustic feedback metric is carried out and provided to the server each time a fine-tuning is carried out in response to an automatic or user initiated trigger, whereby it may be estimated to what degree the fine-tunings are the results of a changed vent effect and even more advantageously give an indication of the correction gain a user tends to prefer for a given measured acoustic feedback metric and hereby also for a given estimated vent effect, which knowledge may be used to update the suggested correction gain for a given measured acoustic feedback metric. Thus the settings for a specific user may be improved based on data from other users.

According to a more specific embodiment the step of determining a correction gain based on the estimated vent effect is based on an analysis of the relationship between a measured acoustic feedback metrics and a currently applied correction gain at points in time where a fine-tuning is to be carried out in response to a user initiated trigger, whereby an optimized value, at least with respect to general user preference, may be obtained because the desire for a fine tuning may be due to a correction gain value that is not preferred by the specific user.

According to another specific embodiment the server is additionally configured to use the received measured acoustic feedback metrics to estimate, for a given hearing aid system user, how often the hearing aid system or at least one of the hearing aids has been removed from the ear and use this data to obtain an optimized hearing aid setting, at least with respect to general user preference, because removal of a hearing aid from the ear may be due to lack of comfort when wearing the hearing aid or a less than optimum hearing aid setting.

It is noted that the present invention is particularly advantageous in order to determine the vent effect for instant-fit earpieces because these types of earpieces are generally more flexible in order to be able to accommodate a variety of ear canals, which leads to a highly varying performance that is strongly dependent on the specific ear canal and consequently it is hard to simulate their performance.

Other modifications and variations of the structures and procedures will be evident to those skilled in the art.

The invention claimed is:

1. A method of fitting a hearing aid gain, comprising the steps of:

providing a plurality of sets of measured values of an acoustic feedback metric and a vent effect based on inserting a hearing aid of a specific type into a plurality of at least one of real ears and artificial ears;

using the plurality of sets of measured values to determine a relationship between the acoustic feedback metric and the vent effect for said specific type of hearing aid;

measuring an acoustic feedback metric for a hearing aid to be fitted, when inserted in a user's ear;

estimating a vent effect for the hearing aid to be fitted based on the determined relationship and the measured acoustic feedback metric;

determining a correction gain based on the estimated vent effect; and incorporating the correction gain in the gain of the hearing aid to be fitted, wherein the hearing aid to be fitted is of said specific type.

2. The method of fitting a hearing aid gain according to claim 1, wherein said specific type of hearing aid is defined at least by the shape and material of the earpiece of the hearing aid.

3. The method of fitting a hearing aid gain according to claim 2, wherein the shape of the earpiece of said specific hearing aid is selected from a group of shapes comprising dome, double dome, tulip dome, hollow ball and hollow bulb shaped.

4. The method of fitting a hearing aid gain according to claim 1, wherein the acoustic feedback metric and the vent effect is both measured for a plurality of specific frequencies or frequency bands, and wherein the step of using the plurality of sets of measured values to determine a relationship between the acoustic feedback metric and the vent effect comprises the steps of:

using for each of said plurality of specific frequencies or frequency bands a function with a predefined shape to obtain a linear or non-linear model of the relationship between the acoustic feedback metric and the vent effect; and combining each of said functions, for said plurality of specific frequencies or frequency bands, across frequency to provide a plurality of relationships of the acoustic feedback metric as a function of frequency wherein each of said relationships represent a specific vent effect.

5. The method of fitting a hearing aid gain according to claim 4, comprising the further steps of:

determining the best possible fit between the measured acoustic feedback metric for the hearing aid to be fitted and said plurality of relationships of the acoustic feedback metric as a function of frequency.

6. The method of fitting a hearing aid gain according to claim 5, wherein the step of determining the best possible fit between the measured acoustic feedback metric for the hearing aid to be fitted and said plurality of relationships of the feedback metric as a function of frequency comprises the further steps of:

determining a plurality of rank correlation coefficients between measured acoustic feedback metrics and measured vent effects for each of said plurality of specific frequencies or frequency bands and based on the plurality of sets of measured values;

using the determined rank correlation coefficients to weight the importance of the considered frequencies relative to each other.

7. The method of fitting a hearing aid gain according to claim 5, wherein the step of determining the best possible fit between the measured acoustic feedback metric for the hearing aid to be fitted and said second plurality of relationships of the feedback metric as a function of frequency is carried out using a method selected from a group comprising: least square methods, estimation least absolute residuals and one-step sine estimator.

8. The method of fitting a gain of a hearing aid according to claim 1, wherein the step of using the first plurality of sets of measured values to derive a relationship between the acoustic feedback equivalent and the vent effect comprises the further step of training a neural network to determine the vent effect based on a measured frequency dependent acoustic feedback metric.

9. A hearing aid fitting system, configured to carry out a method according to claim 1.

10. The hearing aid fitting system according to claim 9 further comprising:

a display device, adapted to:

display a plurality of hearing aid fitting procedure screens adapted to:

initially prompt a hearing aid fitter to select a specific hearing aid earpiece; and secondly provide a correction gain to be incorporated in the final hearing aid gain in order to compensate the vent effect.

* * * * *